United States Patent [19]
Yaniv et al.

[11] Patent Number: 5,313,726
[45] Date of Patent: May 24, 1994

[54] PROGRAMMABLE LIGHT MODULATOR FOR VIEWING TRANSPARENT FILM PRINTS

[75] Inventors: Zvi Yaniv, Farmington Hills; Lionel Robbins, Bloomfield Hills; Clive Catchpole, Birmingham, all of Mich.

[73] Assignee: Advanced Technology Incubator, Inc., Farmington Hills, Mich.

[21] Appl. No.: 988,309

[22] Filed: Dec. 1, 1992

[51] Int. Cl.$^5$ ............................................. G02B 27/02
[52] U.S. Cl. ....................................... 40/361; 359/259; 362/97
[58] Field of Search .................. 40/361, 367, 448, 545; 359/245, 259, 265, 276, 320; 362/33, 18, 19, 97, 317, 321

[56] References Cited

U.S. PATENT DOCUMENTS

| | | | |
|---|---|---|---|
| 3,285,130 | 11/1966 | Cocca et al. | 359/320 X |
| 3,614,200 | 10/1971 | Taylor | 359/259 X |
| 3,644,017 | 2/1972 | Ploss | 359/259 X |
| 3,726,034 | 4/1973 | De Belder et al. | 40/361 |
| 4,404,619 | 9/1983 | Ferguson | 362/97 X |
| 4,510,708 | 4/1985 | Pokrinchak | 40/361 |
| 4,637,150 | 1/1987 | Geluk | 40/361 |

Primary Examiner—Peter Nerbun
Attorney, Agent, or Firm—Kenneth M. Massaroni

[57] ABSTRACT

An improved apparatus for viewing transparent film prints, such as X-rays, mammograms and sonograms, is provided, which apparatus includes a light source, a viewing stage and an array of light valves to selectively prevent the transmission of light from the light source to certain areas of the viewing stage. The apparatus allows an operator to more efficiently and accurately discern detail in the analysis of transparent film prints.

7 Claims, 2 Drawing Sheets

PROGRAMMABLE LIGHT MODULATOR FOR VIEWING TRANSPARENT FILM PRINTS

FIELD OF THE INVENTION

The present invention relates generally to the field of transparent film print analysis, such as X-ray film analysis, and improved equipment for performing such analysis. The present invention more particularly relates to an improvement in the equipment used in illuminating X-rays by eliminating undesired background light, and hence, enhances readability of X-rays. In its most specific form, the invention relates to an array of light valves, such as liquid crystal light valves, interposed between a light source and the X-ray film to be viewed. The array of liquid crystal light valves may be controlled to selectively block light emanating from the light source in all areas other than the area occupied by the X-ray film.

BACKGROUND OF THE INVENTION

In the mid-1970's, the United States Department of Health estimated that approximately 56 visits per year are made to medical offices for X-ray examination, for every 100 persons in the United States. Since that time, it is generally agreed that the diagnostic use of X-rays has increased dramatically. The majority of the X-ray procedures performed in the United States are interpreted by a radiologist who reads the transparent film X-ray prints by holding the print adjacent to an intense source of illumination. The X-rays themselves may be of either conventional procedures such as the chest or the skeleton, or may be more specialized as in the case of mammograms, computed tomography or ultrasound/sonograms. Depending upon the procedure, the transparent film X-ray prints may vary in size from 8×10 inches (or less) in size up to 14×17 or more. Moreover, two to ten or more prints are typically made to document a given procedure. These prints will then be analyzed by comparing them to prints made during previous procedures, to aid the radiologist in spotting deviations in the patient's condition.

It has been generally recognized that the observation of subtle detail in a radiographic film is best done with the aid of very bright illumination from a source of white light on a device known in the field of radiology as a light box. Large medical institutions may use motorized X-ray viewers, sometimes known as alternators, to efficiently view large numbers of X-ray or other transparent prints. As white light is the desired illumination for X-rays, most light boxes employ a large number of fluorescent lamps, such as fluorescent tubes, arranged in a parallel fashion, and rated by "daylight" emission.

A light box of the type commonly employed in hospitals and medical centers around the world is illustrated, in FIG. 1, generally 10, in exploded perspective view. FIG. 1 illustrates a typical light box 10 comprising a light source housing 12 having an open proximal end 12a and a closed distal end 12b. The light source housing 12 may include a backreflector or series of baffles in the distal end 12b to re-direct stray light towards the proximal end 12a of the housing, where X-ray prints will be read. Disposed in the housing 12 is an array of light bulbs or fluorescent tubes 14, driven by conventional or electronic ballasts. The array is connected to a source of electricity, such a wall outlet, to provide energy to illuminate said tubes. Disposed at the proximal end 12a of the box, i.e., the open end, is a translucent light diffuser 16 adapted to diffuse light generated by the light array 14. A diffuser 16 provides a uniform distribution of light across the entire proximal end 12a of the housing 12. This is critical since the average institutional light box or alternator is a wall-sized device having dimensions of four feet by eight feet or more. The diffuser 16 can also be adapted to function as the stage upon which the transparent film print is disposed for analysis.

Further, an article entitled *Spatial Modulation Transfer in the Human Eye*, by Van Nes and Bauman, *Journal of the Optical Society of America*, Vol. 57, pp 401-406, 1967 published the results of visual experimentation which proved that the perception of a small contrast in a transparent film, i.e., the relative change in luminance for two regions having a small difference in film density or transmittance, improves as the average luminance is increased up to a luminance of 100 cd/m$^2$. A typical alternator might have a luminance of approximately 2600 cd/m$^2$. This will yield a minimum luminance of 8.22 cd/m$^2$ and a maximum luminance of 1640 cd/m$^2$ when viewing a film with a minimum film density of 0.2 and a maximum film density of 2.5.

A major limitation of the human eye for viewing images, such as X-ray prints, is related to the eye's adaptation to average luminance. It has been found that the eye's ability to detect small contrast in images is best when the average luminance of the region of the image containing the contrasting object is equal to the average luminance in the surrounding film. See Schreiber, W. F., *Fundamentals of Electronic Imaging Systems*, Springer-Verlag, Berlin, 1986. Accordingly, if a film with a high density and a low luminance is surrounded by a high luminance background, the response of the eye to contrast in the film is far inferior to the eye's response when the surrounding area has the same luminance as the average luminance of the film. The physiological reasons for this phenomenon have been explained as originating, at least in part, from light scattering within the optics of the eye, as is fully explained in Diffusion of the human retina and quality of the optics of the eye on the fovea and the peripheral retina, *Vision Research*, 19: 907-911 (1979). Moreover, the deleterious effects of this phenomenon upon the field of radiology has been well documented. See, Changes in lesion detection caused by light adaptation in retinal photoreceptors, *Invest. Rad.*, 17: 394-401 (1982); and Influence of ambient light on the visual sensitometric properties of, and detail perception on, a radiograph, *Proceedings SPIE*, 273: 57-62, (1981).

Accordingly, the wall-sized light boxes or alternators are generally located in rooms having dim ambient lighting since room light can scatter off the X-ray film print itself, further degrading the quality of the film analysis. Unfortunately, radiographs are produced in varying sizes which are much smaller than the wall sized alternators. This of course produces sub-optimal viewing for the physiological reasons noted above. Numerous solutions have been proposed based upon simple mechanical devices to shutter the alternator in areas not covered by exposed film. Some of these proposed improvements are set forth in A self-masking film illumination system, *British Journal of Radiology*, 47: 283, (1974); and Automatic view box, *American Journal of Roentgenography*, 106: 218, (1969). Despite the seeming simplicity of the problem, none of these devices have satisfied the needs of the field, due primarily to poor reliability, inability to effectively mask stray or deleterious light and difficulty in fine adjustment of the mechanical systems for smaller X-ray prints. Ease of operation is a major factor in the utility of the device, given the large number of prints analyzed by the average radiologist each day. Accordingly, radiologists and other medical professionals have been forced to resort to relatively primitive methods of enhancing the viewing of X-ray prints. See Use of the cupped hand for improving viewing of radiographs, *Radiology*, 143: 563, (1982).

These and other limitations of the prior art are obviated by the invention disclosed and claimed herein.

BRIEF DESCRIPTION OF THE INVENTION

It is an object of the present invention to provide a transparent film print viewing apparatus which overcomes the limitations of the prior art devices by providing an array of electronic light valves, such as liquid crystal light valves, which can selectively prevent light emanating from a light source from reaching certain areas of the diffuser or stage where the transparent film prints are viewed.

The instant invention is an apparatus for viewing transparent film prints which comprises a back light assembly including a light source such as one or more light bulbs or tubes, such as fluorescent tubes, and a light diffusing means, such as a translucent light diffuser. The light diffuser is operatively disposed on a first side of said light source, the viewer proximal side and is adapted to provide a uniform distribution of light thereacross. This light diffuser is also adapted to act as the stage area upon which transparent film prints, such as X-rays are disposed for analysis.

The invention further includes a programmable array including at least one light valve, such as a liquid crystal light valve, adapted to operate in either an opaque or transparent mode. The light valves of the programmable array may also be adapted to operate in the grey-scale mode. By offering the ability to vary the intensity of the light between transparent and opaque, it is possible to further improve the readability of X-ray prints. The liquid crystal light valve array is spacedly disposed from said light source and said light diffusing means. The liquid crystal light valve is adapted to selectively and substantially prevent light emanating from said light source from reaching said light diffuser. Accordingly, only certain portions of the viewing stage are illuminated by the backlight. In one preferred embodiment of the invention the light valves are liquid crystal light valves, though other types of light valves which may be used in this invention include, but are not limited to electro-mechanical and solid state electro-optic modulators. It is to be understood however, that any other types of light valves which satisfy the criteria of transmissivity, uniformity, operating temperature and cost may be employed without departing from the spirit or scope of the instant invention.

The transparent print viewing apparatus may further include an optical element, such as a lens array or other apparatus adapted to reduce or eliminate optical artifacts. Optical artifacts are areas of inconsistent light intensity caused by, for example, the "seam" between adjacent light valves. The optical element is operatively interposed between the programmable array of light valves and the diffuser.

In order to selectively illuminate only those areas of the viewing stage desired, i.e., those areas underlying a particular feature of a transparent film print, the invention further includes means for switching the at least one liquid crystal light valve between the opaque and transparent mode. The switching means comprises a touch sensitive panel that is subdivided into a number of areas corresponding to the number of light valves in said programmable array. The touch sensitive panel may react to, for example, the touch of a human finger, or a stylus. The touch sensitive panel may be sized and shaped to correspond to the light diffusing means. It is then disposed upon the viewer proximal side of the light diffusing means. Each sub-area of said touch sensitive display is adapted to switch its corresponding liquid crystal light valve between the transparent and opaque modes.

Alternatively, the switching means can comprise a touch sensitive flat panel display, that is subdivided into a number of areas corresponding to the number of light valves in said programmable array. The flat panel display could be a smaller version of the programmable array adapted for hand-held or portable operation of the programmable array. The flat panel display can be, but is not limited to, a liquid crystal display, a plasma display, an electroluminescent display, or may even be a cathode ray tube. The switching means may also include a "mouse" or any other type of "point-and-shoot" type device.

These and other objects and advantages of the subject invention will become apparent from a perusal of the Detailed Description of the Invention, the Drawings and the Claims which follow.

DETAILED DESCRIPTION OF THE INVENTION

Figure 1:
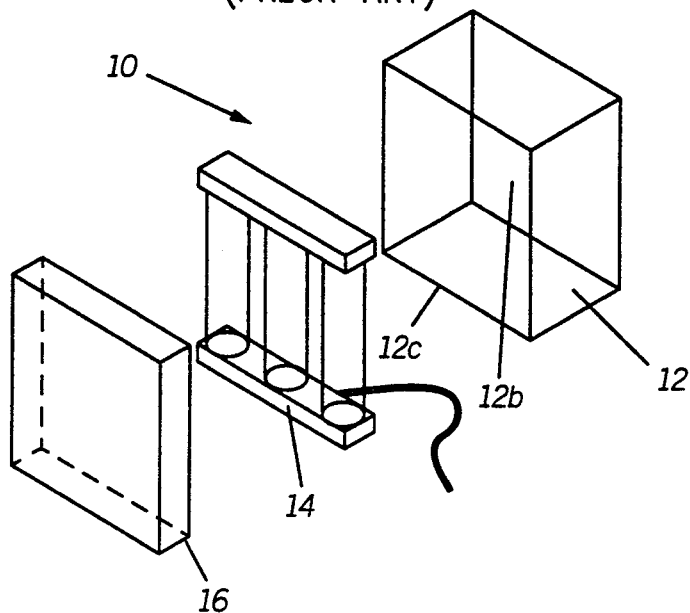
FIG. 1 illustrates in exploded, perspective view, the prior art light box or alternator used for reading X-rays, radiographs and other transparent film prints.
Figure 2:
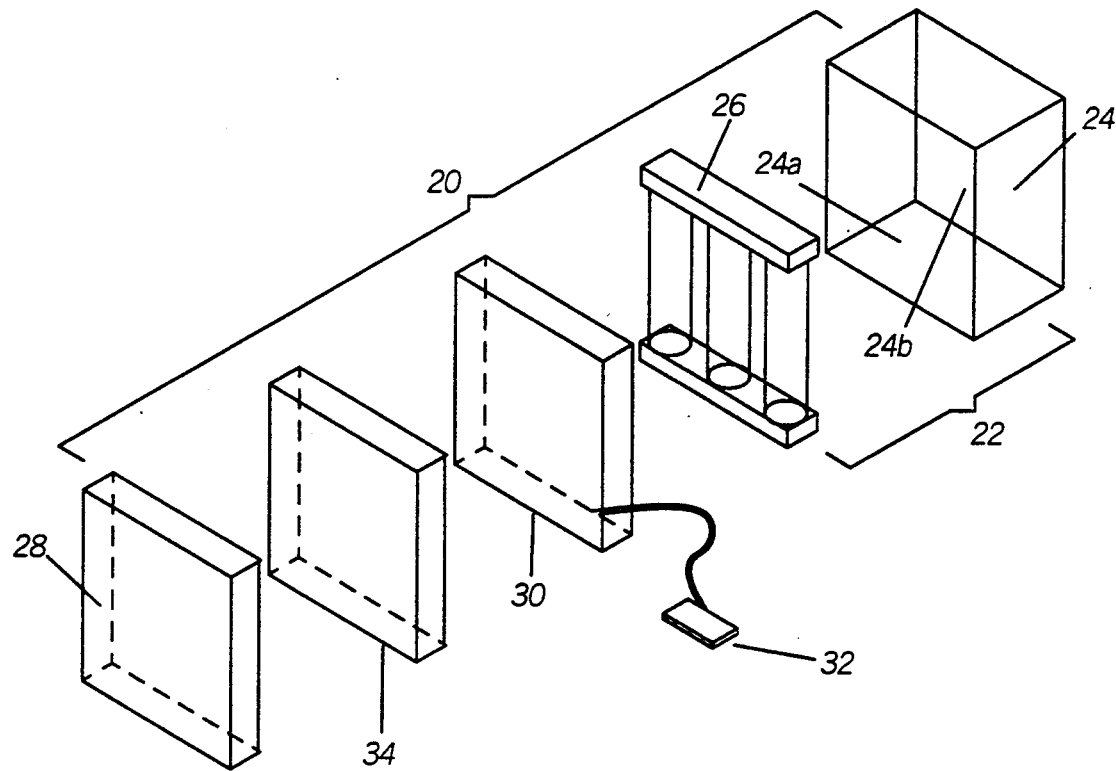
FIG. 2 illustrates in exploded, perspective view, the viewing apparatus of the instant invention, wherein the controller is a sized and shaped to correspond to the light diffuser, and is disposed thereupon.

Referring to FIG. 2, there is illustrated therein, in exploded, perspective view, the transparent film viewing apparatus of the instant invention which is generally identified by reference numeral 20. The apparatus consists of a backlight assembly 22 including a backreflector housing 24 and a light source 26. The light source may be either a point source light such as a single light bulb or a fluorescent tube. Alternatively, as is illustrated in FIG. 2, the light source may be a plurality of light sources such as the three fluorescent tubes illustrated. The fluorescent tubes will typically be driven be conventional or electronic ballasts. The light source may be a white light source or may be adapted to project a specific wavelength of light in the visible or near visible, i.e., ultraviolet or infra-red, spectrum. The light source is disposed in the backreflector housing 24, which is generally a rectangular, opaque structure having a proximal, open end 24a and a distal closed end 24b. The backreflector housing 24 is adapted to contain the light source 26. The backreflector housing 24 may be equipped with additional components adapted to redirect light toward the proximal end 24 of the structure. Examples of such components include, but are not limited to, a light reflective interior coating and reflective baffle structures.

Disposed over the proximal end 24a of the backlight assembly 22 is a light diffuser 28 adapted to assure a uniform dispersion of light projected by the backlight assembly 22. The light diffuser 28 is typically a translucent sheet of glass or polymeric material which is adapted to act as the stage upon which transparent film prints, such as X-rays, may be mounted for analysis. As has been noted hereinabove, prior art devices of this type are typically rather large, being on the order of 4 feet by 8 feet or larger. The typical X-ray print is on the order of approximately one foot square. Hence, to eliminate the transmission of light from all areas of the light diffuser not immediately subjacent a given transparent film print, a programmable array 30 connected to a controller 32 is disposed between the light source 26 and the light diffuser 28. The programmable array 30 includes at least one electronic light valve, such as a liquid crystal light valve, which is adapted to operate in either a transparent or an opaque mode. Hence, in the embodiment wherein the programmable array 30 includes a single light valve, no light will be transmitted when the array 30 is in the opaque mode. The light valve may be a liquid crystal light valve, an electrochromic light valve, a solid state electro-optic modulator light valve or any other electronic or electromechanical light valve which may be adapted to block the transmittance of light. In a preferred embodiment of the instant invention, the light valve is a liquid crystal light valve. The liquid crystal light valve may be further adapted to operate in the grey-scale mode of operation. That is, the light valve may be able to provide varying intensities of light by operating in modes other than only opaque and transparent. In this way a viewer analyzing an X-ray print may be able to fine tune to the intensity of light beneath a particular part of a single print to enhance the analysis.

The transparent viewing apparatus 20 may further include an optical element 34 operatively disposed between said diffuser 28 and the programmable array 30. The optical element 34 is provided to eliminate or reduce optical artifacts that could degrade the uniformity of light on the diffuser 28. These optical artifacts may be found in the presence of areas of inconsistent light intensity caused by the "seam" around adjacent light valves. This seam is the result of, for example, the shadow cast by the opaque grid which supports the array of light valves. Optical elements which reduce or eliminate these optical artifacts include, but are not limited to, lens arrays, fiber optic faceplates and a series of tubes for conducting light from the programmable array to the diffuser.

Figure 3A:
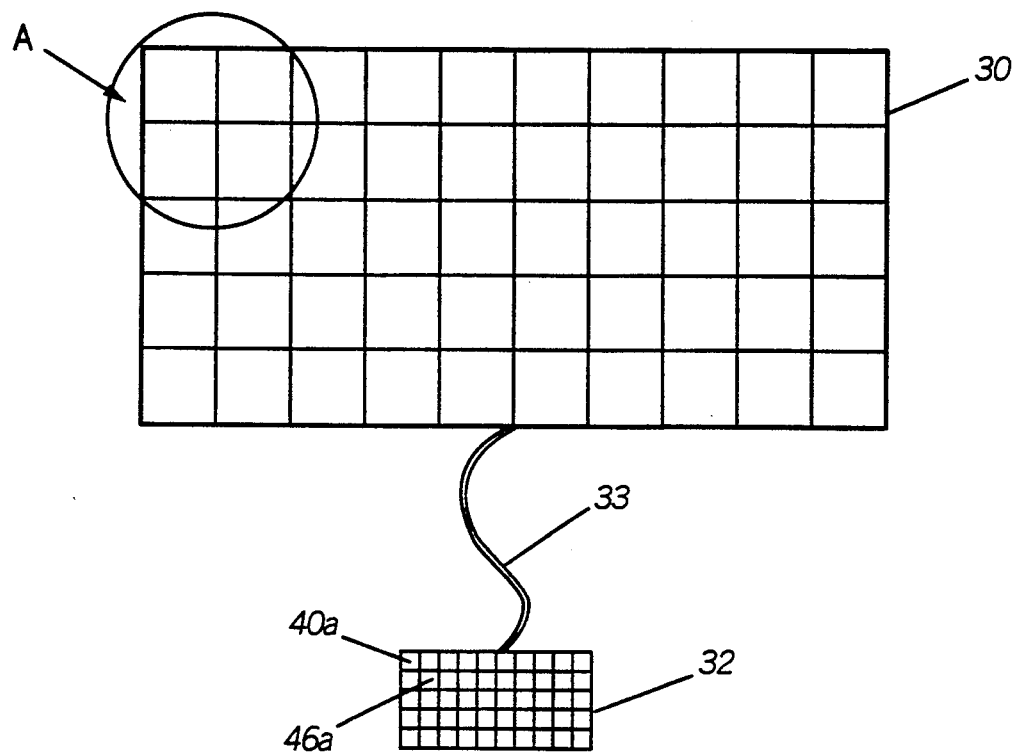
FIG. 3A is a front view of the light valve array and switching means adapted to change the array from the transparent to the opaque mode.

Referring now to FIG. 3A, there is illustrated therein a front view of the programmable array 30 and controller 32 of FIG. 2, including a plurality of light valves, such as liquid crystal light valves and switching means adapted to change each light valve in the array from the transparent to the opaque mode and back. The programmable array 30 of FIG. 3A illustrates a light valve assembly comprising fifty light valves arranged in a matrix of 10 columns by five rows, though it is to be understood that the programmable array 30 may include any number of liquid crystal light valves arranged in an N×M matrix of rows and columns, or indeed may be arranged in any shape or size.

Figure 3B:
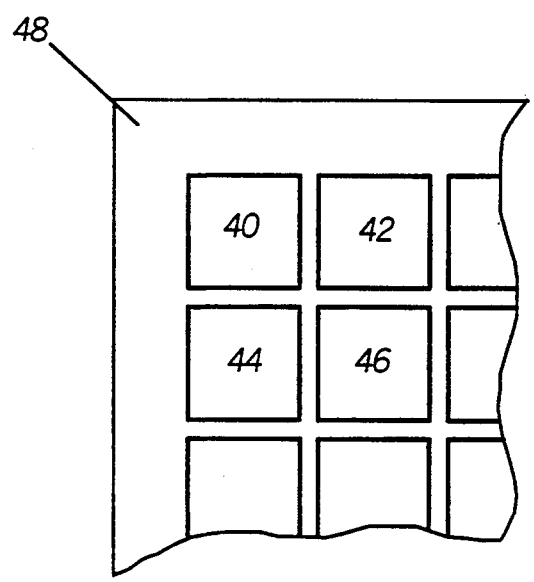
FIG. 3B is a fragmentary, front view, of area A in FIG. 3A, illustrating discrete light valves mounted in an opaque support structure.

Referring to FIG. 3B, there is illustrated therein a fragmentary, front view, of area A in FIG. 3A, illustrating discrete light valves 40, 42, 44, 46 mounted in an opaque support structure 48. The support structure 48 may be fabricated from any relatively lightweight opaque material, such as plastic, which is sufficiently strong to bear the weight of the plurality of liquid crystal light valves mounted therein. It may be appreciated from a perusal of FIG. 3B that the support structure 48 defines a matrix of substantially parallel rows and columns, and the space between each two adjacent rows and each two adjacent columns defining an opening adapted to engage one of said liquid crystal light valves. As each of the liquid crystal light valves of FIG. 3A are substantially identical and are similarly engaged in the support structure 48, only light valves 40, 42, 44 and 46 are illustrated in the surrounding support structure 48.

Returning to FIG. 3A, each of the liquid crystal light valves in the programmable array 30 are adapted to operate in either the transparent or opaque mode. Accordingly, the liquid crystal light valves are typically either twisted nematic or dichroic liquid crystal material light valves, though other types of light valves, such as electro-mechanical and solid state electro-optic modulators may be employed. It is to be understood however, that any other types of light valves which satisfy the criteria of transmissivity, uniformity, operating temperature and cost may be employed without departing from the spirit or scope of the instant invention.

The programmable array 30 of FIG. 3A includes a controller 32 adapted to switch the individual liquid crystal light valves thereof between the transparent and opaque modes. The controller 32 comprises a touch sensitive panel that is subdivided into a number of areas corresponding to the number of light valves in said programmable array. The touch sensitive panel may react to, for example, the touch of a human finger, or a stylus. The touch sensitive panel may be sized and shaped to correspond to the light diffuser 28. The controller 32 is then disposed upon the viewer proximal side of the light diffuser 28, and is in electrical communication with the programmable array 30 via communications lead 33. Each sub-area of said touch sensitive display is adapted to switch its corresponding liquid crystal light valve between the transparent and opaque modes.

Alternatively, the controller 32 may consist of a flat panel display overlayed with a transparent touch panel, both of which are in electrical communication with the programmable array 30 via communications lead 33. Both the display and the transparent touch panel of the controller 32 are subdivided into a number of discrete areas which corresponds to the number of liquid crystal light valves employed in the programmable array 30. Hence, controller 32 is a smaller replica of the programmable array 30 subdivided into 50 discrete areas, each area corresponding to a similarly located area of the programmable array 30.

Touching any area of the controller 32 will switch the corresponding area of the programmable array 30 from the transparent to the opaque mode depending on the beginning state. Accordingly, if liquid crystal light valves 40 and 46 of FIG. 3A are in the transparent mode, touching controller area 40a and 46a will switch light valves 40 and 46 to the opaque mode. Touching controller areas 40a and 46a a second time will switch light valves 40 and 46 back to the transparent mode. This mode of operation has the advantage of allowing an operator to quickly darken the entire viewing stage not immediately subjacent the transparent film print to be viewed, thus eliminating excess illumination that could deleteriously affect an operators ability to discern detail in the analysis of a given transparent film print.

As may be readily appreciated by those skilled in the art, the present invention can be practiced other than as is specifically disclosed herein. Thus, while the instant invention has been described with respect to certain preferred embodiments thereof, it is to be understood that the foregoing and other modifications and variations may be made without departing from the spirit or scope thereof.

We claim:

1. An apparatus for viewing transparent film prints, said apparatus comprising:
   - a back light assembly including a light source and a light diffusing means, said light diffusing means operatively disposed on a first side of said light source and adapted to provide a uniform distribution of light thereacross;
   - a programmable array including at least one liquid crystal light valve adapted to operate in either an opaque or transparent mode, said liquid crystal light valve array being operatively disposed between said light source and said light diffusing means, and adapted to selectively prevent light emanating from said light source from reaching said light diffuser;
   - an optical element operatively disposed between said programmable array and said diffuser to reduce optical artifacts caused by said programmable array; and
   - means for switching said at least one light valve between the opaque and transparent mode, said switching means comprising a touch sensitive panel.

2. A film viewing apparatus as in claim 1, wherein said light valves are adapted for grey-scale operation.

3. A film viewing apparatus as in claim 1, further including a substantially rectangular support structure, said structure defining a matrix of substantially parallel rows and columns, and the space between each two adjacent rows and each two adjacent columns defining an opening adapted to engage one of said liquid crystal light valves.

4. A film viewing apparatus as in claim 1, wherein said touch sensitive panel is a touch sensitive flat panel display subdivided into a number of areas corresponding to the number of liquid crystal light valves in said programmable array.

5. A transparent film viewing device, including a light source and a light diffusing means, having a light modulation apparatus to selectively control the transmission of light onto said light diffusing means, said light modulating apparatus comprising:
   - a programmable array including a plurality of light valves, each said light valve being independently controllable, for operation in either an opaque or transparent mode, said light valve array being operatively disposed between the light source and the light diffusing means of said film viewing device, and selectively preventing light emanating from said light source from reaching said light diffuser; and
   - means for switching said plurality of light valves between the opaque and transparent mode, said switching means comprising a touch sensitive panel, said touch sensitive panel being subdivided into a number of areas corresponding to the number of light valves in said programmable array.

6. An light modulating apparatus as in claim 5, wherein said light valves are adapted for grey-scale operations.

7. A light modulating apparatus as in claim 5, wherein said light valves are liquid crystal light valves.

* * * * *